No. 709,671. Patented Sept. 23, 1902.
J. GOLOB.
ACCORDION.
(Application filed June 12, 1901.)
(No Model.) 9 Sheets—Sheet 1.

Witnesses:
Inventor:
John Golob,
by L. B. Coupland & Co
Att'ys.

No. 709,671. Patented Sept. 23, 1902.
J. GOLOB.
ACCORDION.
(Application filed June 12, 1901.)
(No Model.) 9 Sheets—Sheet 2.

Witnesses.
Inventor:
John Golob.
By L. B. Coupland & Co
Att'ys.

No. 709,671. Patented Sept. 23, 1902.
J. GOLOB.
ACCORDION.
(Application filed June 12, 1901.)
(No Model.) 9 Sheets—Sheet 5.

Witnesses:
Inventor:
John Golob,
By L. B. Coupland & Co
Att'ys.

No. 709,671. Patented Sept. 23, 1902.
J. GOLOB.
ACCORDION.
(Application filed June 12, 1901.)
(No Model.) 9 Sheets—Sheet 6.

Witnesses:
Chas. E. Gaylord,
John Enders Jr.

Inventor:
John Golob,
By L. B. Coupland & Co.
Attys.

No. 709,671. Patented Sept. 23, 1902.
J. GOLOB.
ACCORDION.
(Application filed June 12, 1901.)
(No Model.) 9 Sheets—Sheet 7.

Witnesses: Inventor:
John Golob,
By L. B. Copeland & Co.
Att'ys.

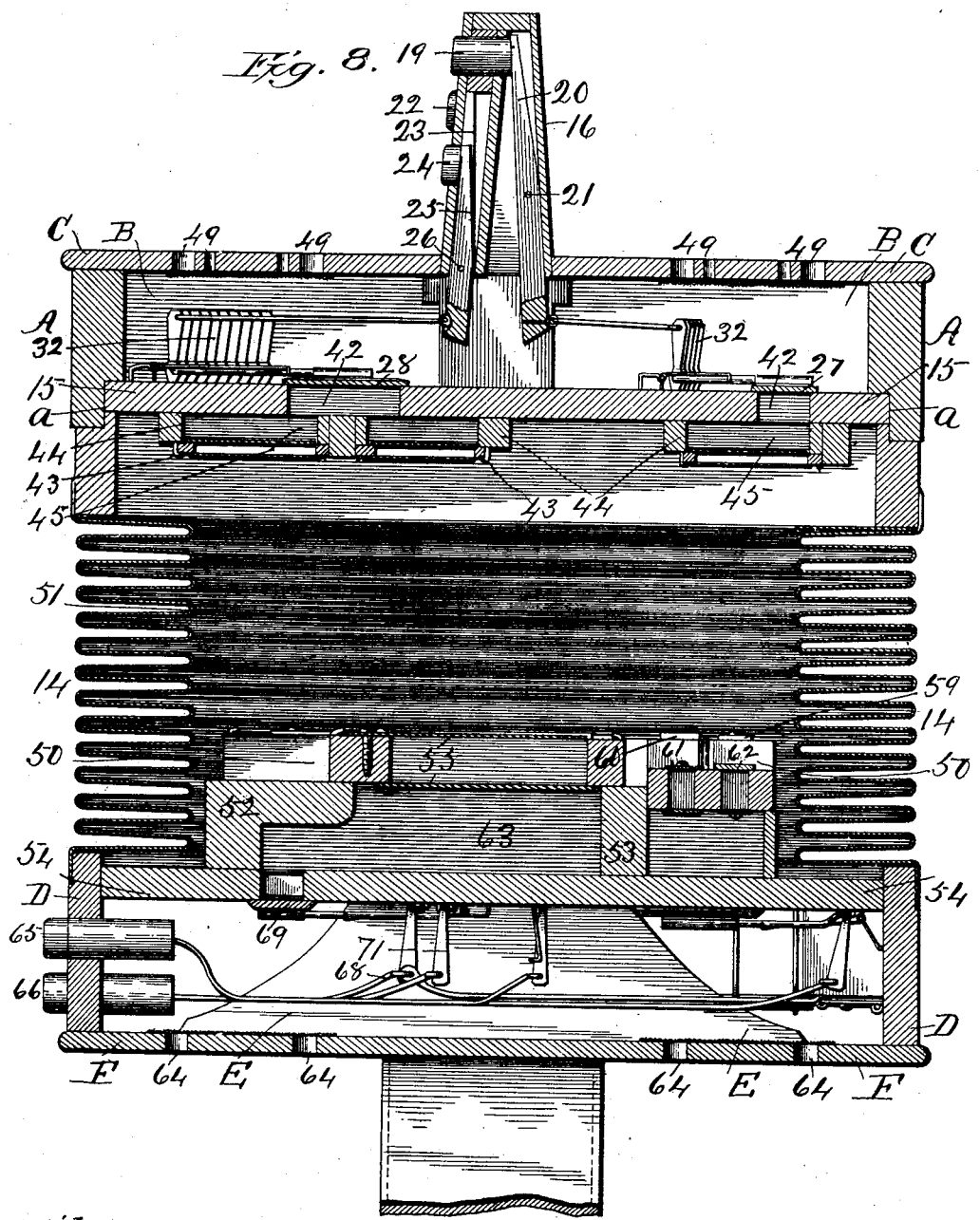

No. 709,671. Patented Sept. 23, 1902.
J. GOLOB.
ACCORDION.
(Application filed June 12, 1901.)
(No Model.)
9 Sheets—Sheet 9.
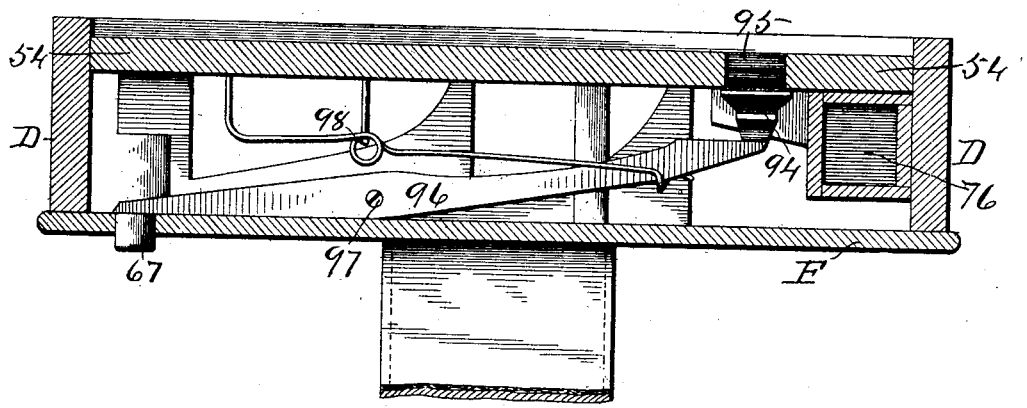
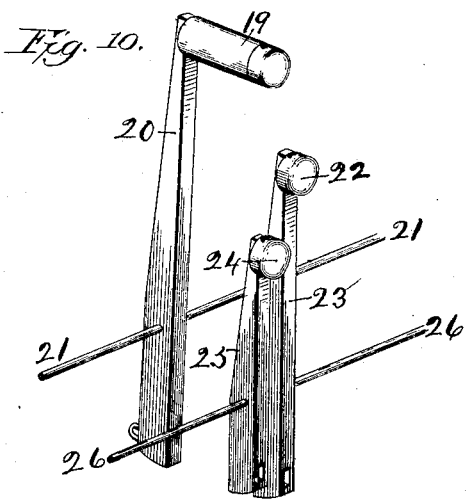
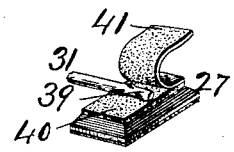
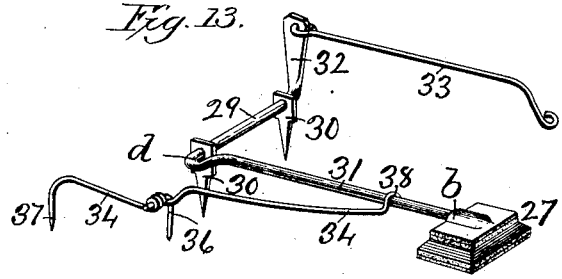
Witnesses:
Inventor:
John Golob,
By L. B. Coupland & Co.
Att'ys.

UNITED STATES PATENT OFFICE.

JOHN GOLOB, OF JOLIET, ILLINOIS.

ACCORDION.

SPECIFICATION forming part of Letters Patent No. 709,671, dated September 23, 1902.

Application filed June 12, 1901. Serial No. 64,240. (No model.)

*To all whom it may concern:*

Be it known that I, JOHN GOLOB, a citizen of the United States, residing at Joliet, in the county of Will and State of Illinois, have invented certain new and useful Improvements in Accordions; and I do hereby declare the following to be a full, clear, and exact description of the invention, such as will enable others skilled in the art to which it appertains to make and use the same.

This invention relates to improvements in accordions and like instruments, and has for its object to provide a compact and portable device of this character having an increased compass within convenient limited dimensions with reference to the dimensions of the inclosing case, the same consisting of certain novel features in the construction, arrangement, and operation of the different parts, as will be hereinafter set forth.

Figure 1:
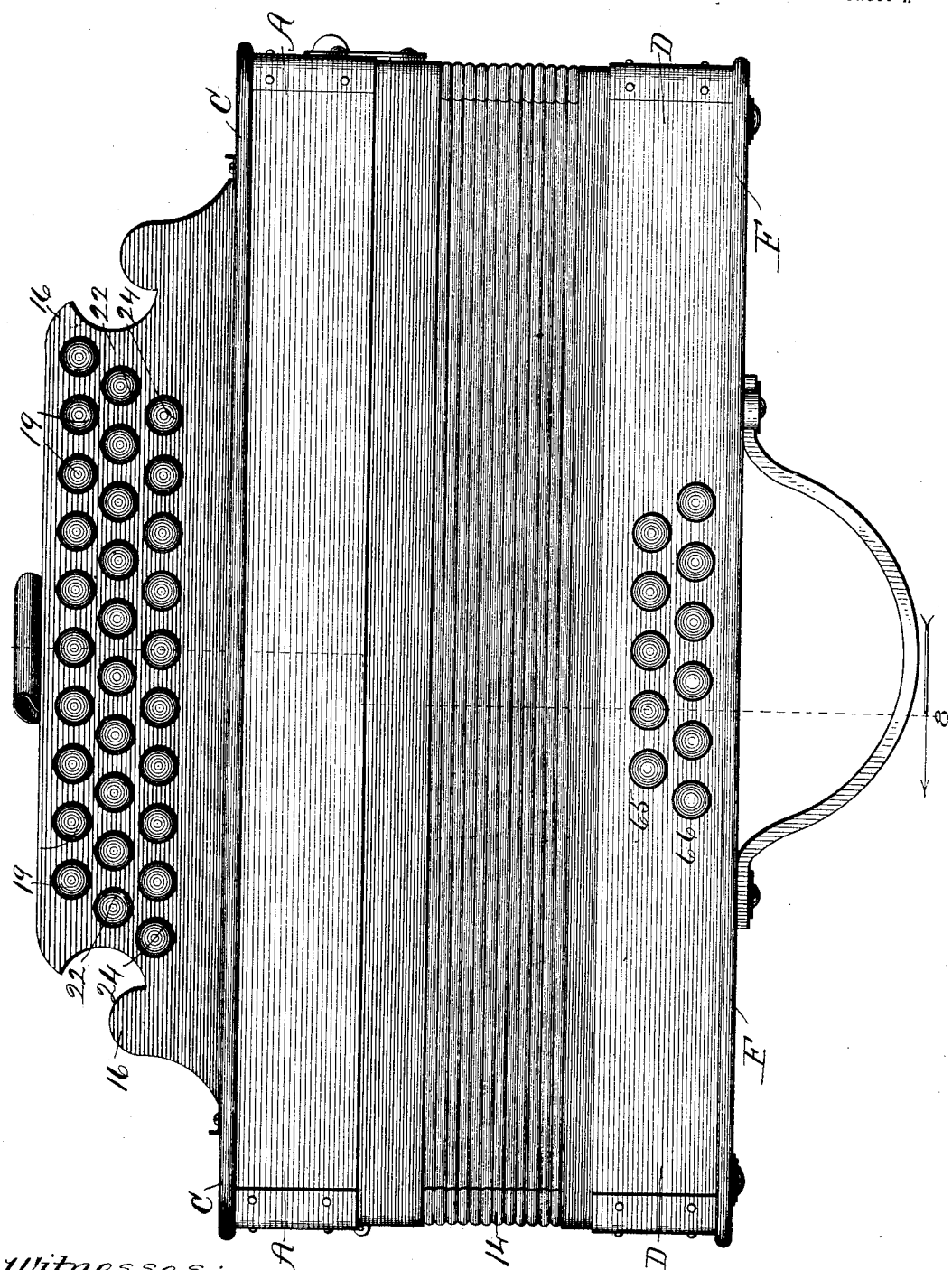
Figure 2:
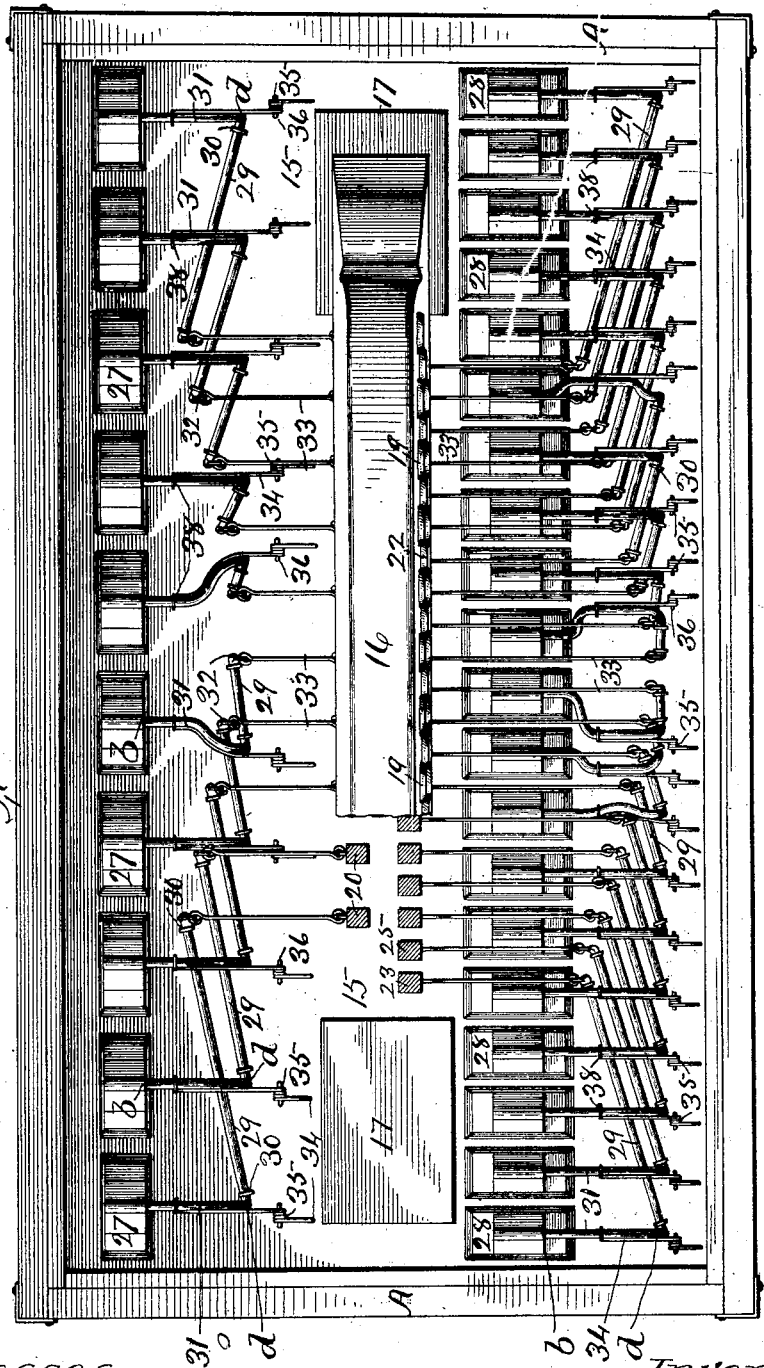
Figure 3:
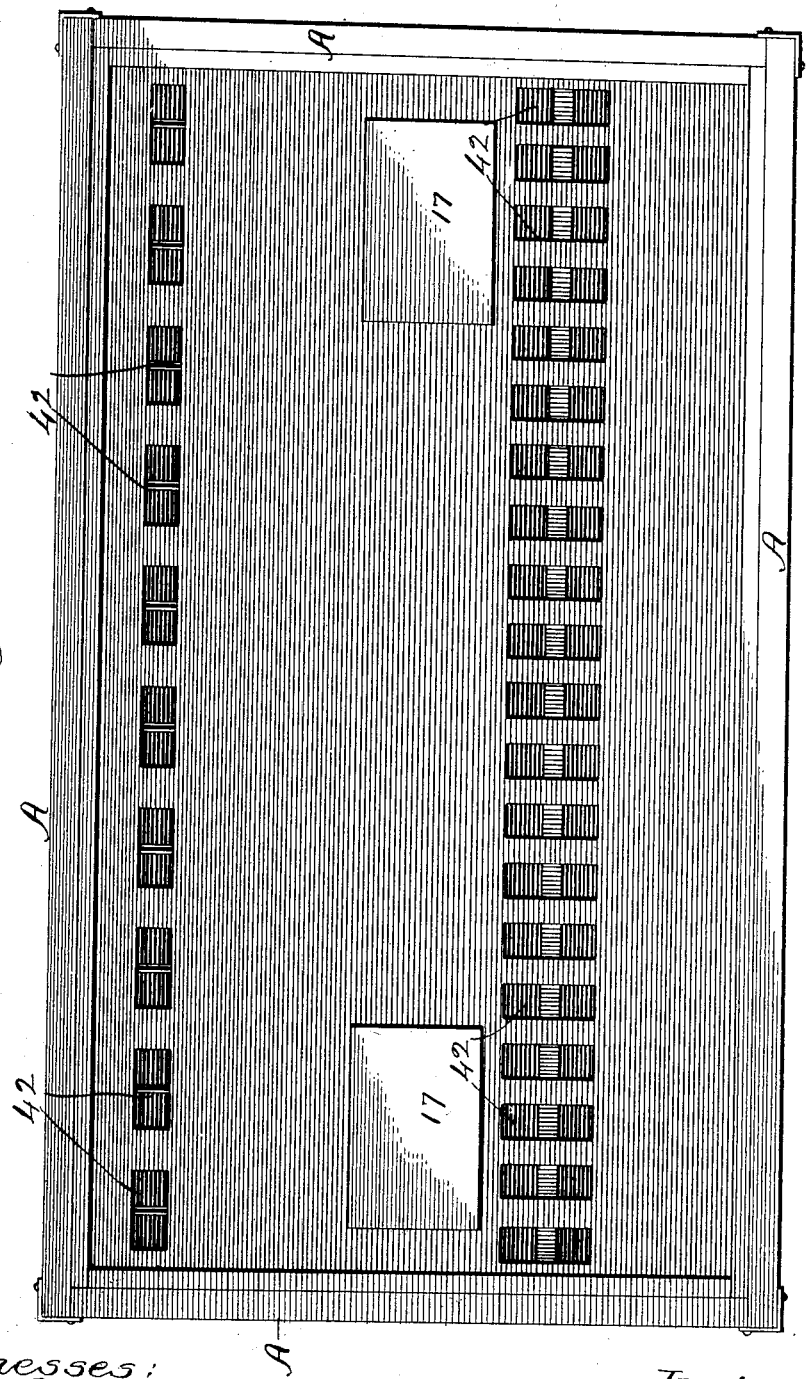
Figure 4:
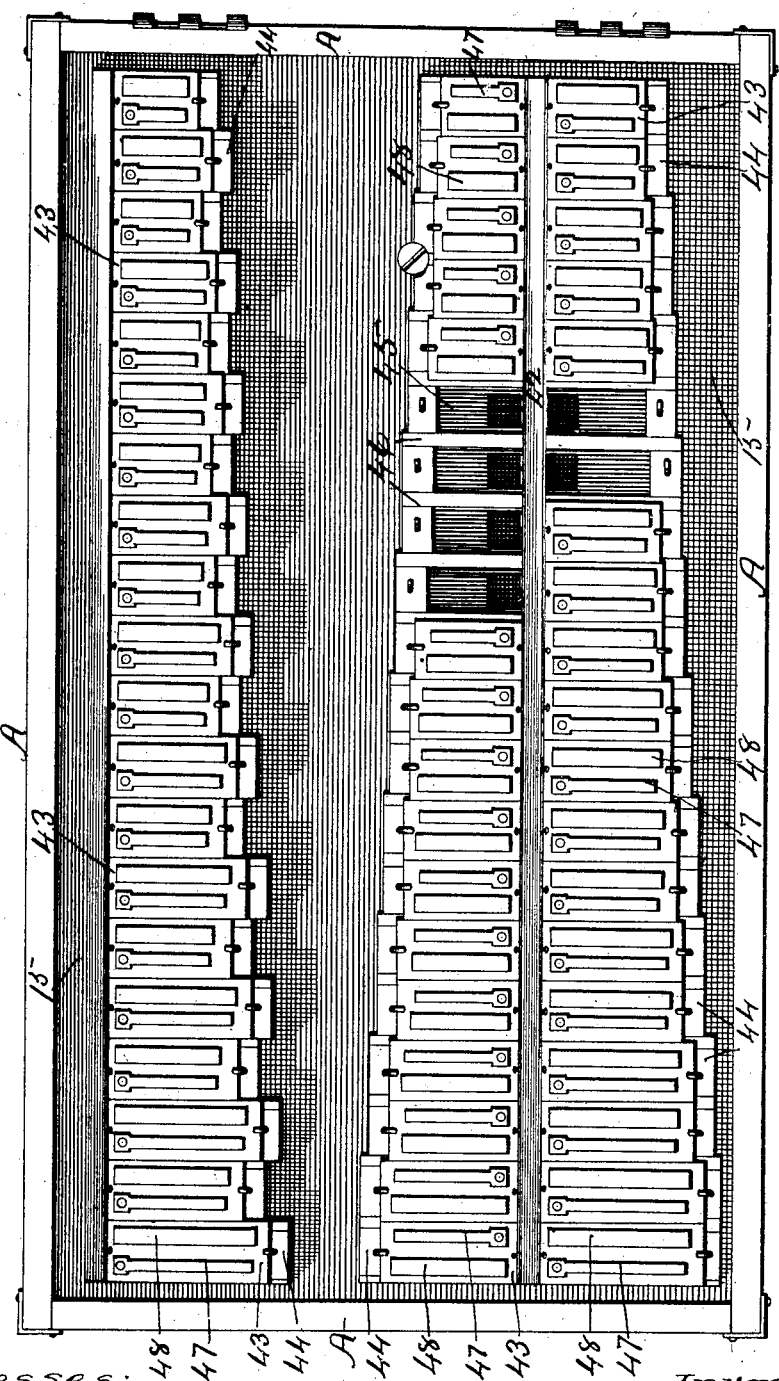
Figure 5:
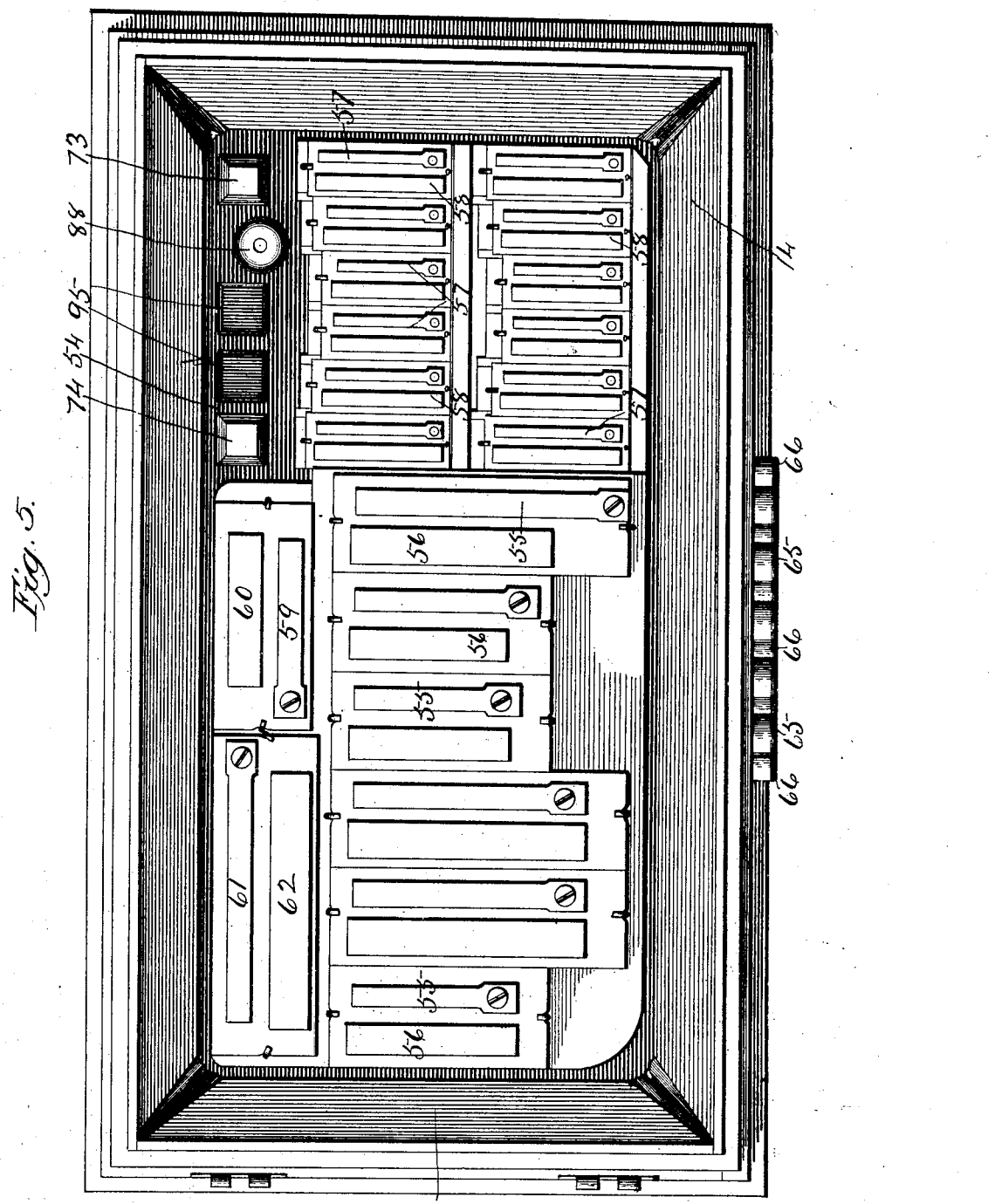
Figure 6:
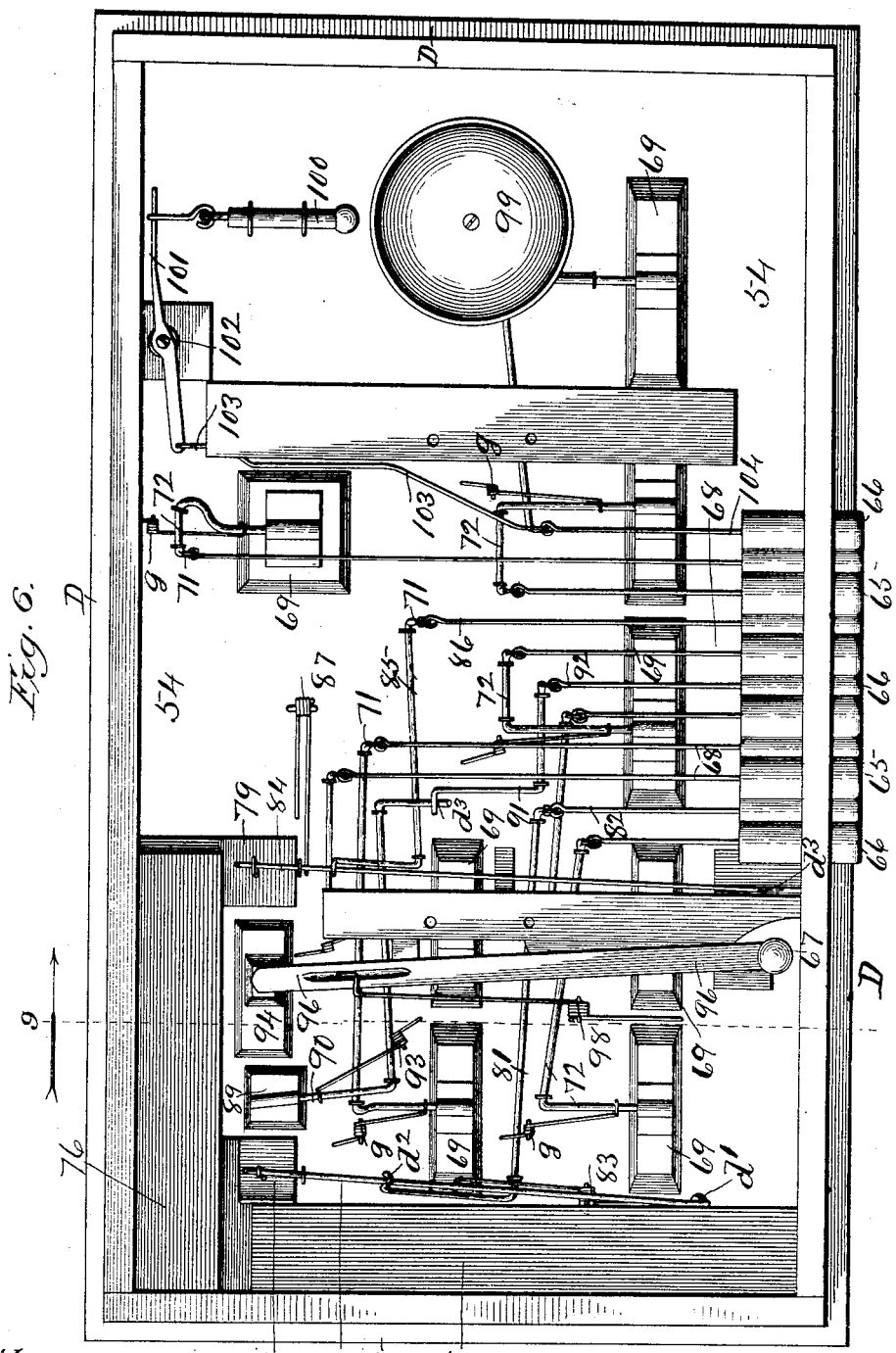
Figure 7:
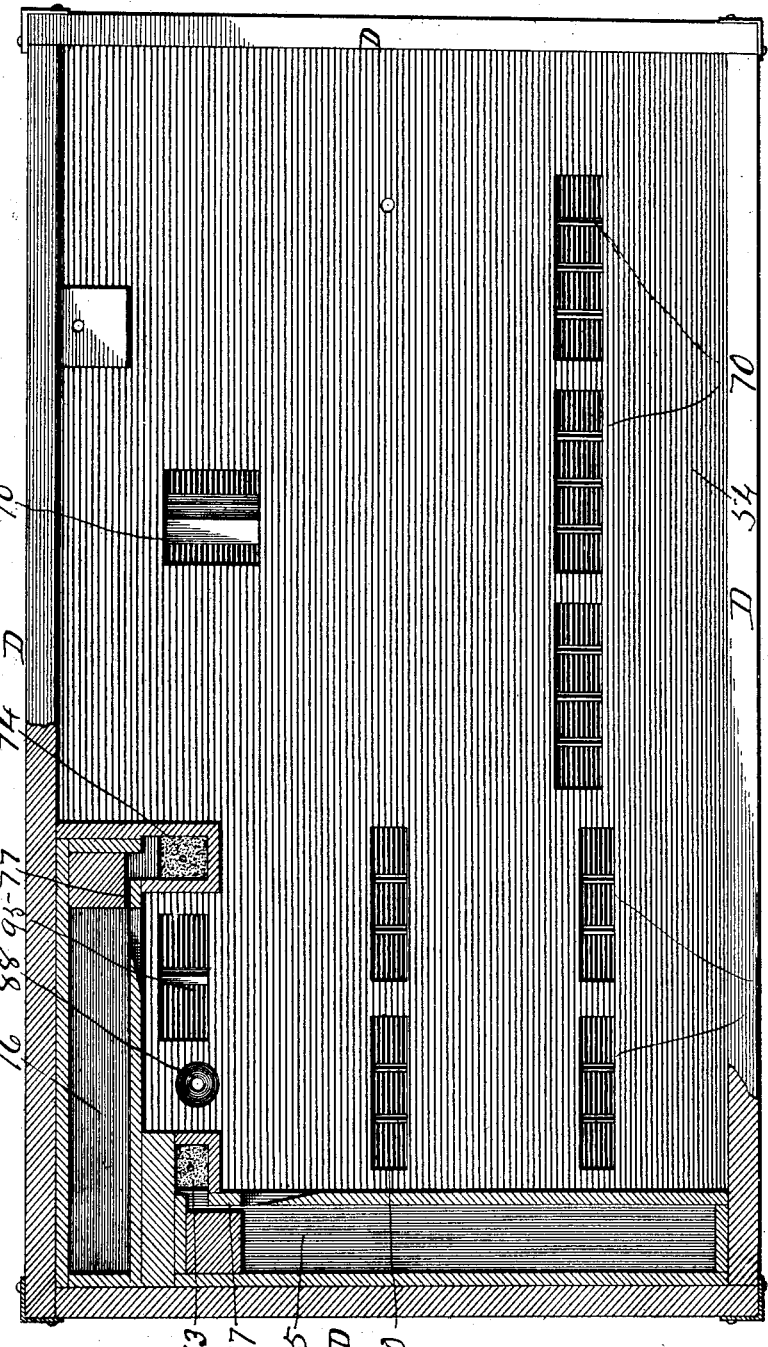

In the accompanying drawings, Figure 1 is a front elevation looking at the finger-board side. Fig. 2 is a plan of the upper reed and keyboard, the cover of the top portion of the case being removed. Fig. 3 is a similar plan, the finger-board and valves being removed. Fig. 4 is a plan of the under side of the reed-board shown in Figs. 2 and 3. Fig. 5 is a top plan of the lower reed-board. Fig. 6 is a plan looking upwardly showing the under side of a valve-board located below the lower reed-board, the bottom cover of the lower part of the case being removed. Fig. 7 is a bottom plan and part section of the valve-board shown in Fig. 6, the operating devices being removed. Fig. 8 is a vertical transverse section on line 8, Fig. 1, looking in the direction indicated by the arrow. Fig. 9 is a vertical transverse section on line 9, Fig. 6. Fig. 10 is a view in perspective of a number of the push-buttons and lever connections for actuating the key-valves. Fig. 11 is a view of one of the push-buttons, and Figs. 12 and 13 detached details of construction.

A represents the side and end walls of the upper part of the casing inclosing a chamber B and is provided with a removable cover C. The lower part D of the casing incloses a chamber E and is provided with a detachable bottom F. The upper and lower parts of the casing are connected by the bellows 14, as shown in Fig. 8.

The respective border edges of the upper key or reed board 15 are secured in the inclosing walls, as at *a*.

The finger-board 16 is hollow and has its respective ends secured to the blocks 17, mounted on the upper side of the keyboard 15, as shown in Figs. 2 and 3. The push-buttons are arranged in the finger-board and protrude therefrom. The inner ends of the push or playing buttons are provided with a groove 18, Fig. 11, forming a recess for the engagement of the adjacent edge of the system of levers for operating the key-valves.

The upper row of buttons 19 is secured to the upper ends, Fig. 10, of the longer levers 20, pivotally mounted on a pivot-rod 21. The second row of buttons 22 is secured to the shorter levers 23, and the third or lower row 24 to the shortest levers 25, the two shorter series of which are mounted on the pivot-rod 26, which provides for the proper rocking movement in opening and closing the key-valves.

The series of key-valves 27, Fig. 2, (ten in number) open away from the finger-board and are located at one side thereof. The series of valves 28 (twenty in number) is located on the opposite side and opens toward the finger-board. The connections between the key valves and levers are such as to insure easy and positive action and will be next described. The connections are alike, and a description of one will answer for all. A detached detail of a valve and connection is illustrated in Fig. 13.

A rock-shaft 29 is mounted in bearings 30, the pointed ends of which are inserted in the upper side of the key-board 15.

One end of a rod 31 is secured to the key-valves 27, as at *b*. The rod 31 is an integral part of rock-shaft 29, and the connection or junction between the two parts is in the form of an angle-bend, as at *d*, the rock shaft or shafts being set diagonally when in their working position with reference to the inclosing case, so as to require less space.

Each of the rock-shafts 29 is provided with a rocker-arm 32, to which is attached one end of a wire 33, the opposite end of which connects with the lower ends of the series of levers mounting the push-buttons.

The series of key-valves on each side of the finger-board is automatically and normally closed by spring-pressure. These springs are of the form more clearly shown in Fig. 13, and consist of a piece of spring-wire 34, provided near its longitudinal center with a tension-coil 35, coiled around an angular binding-post 36, fixed in the keyboard 15. The end 37 of spring 34 is anchored in the keyboard. The opposite end is provided with a loop 38 and engages the upper sides of the rock-shaft rods 31 with a downward pressure in retaining the series of key-valves in their normally closed position, thus always insuring the valves being tightly closed. By this arrangement the connections between the push-button levers and key-valves provide for an easy free elbow movement and an assured positive action. These parts are also less liable to be affected by atmospheric changes than the ordinary arrangement and leakage of the valves prevented, thus insuring full, clear, and sweet notes.

The ends of the rods 31 are provided with spurs 39, Fig. 12, so that the key-valves cannot disengage therefrom. The ends rest on a cushion 40 and are secured by a flexible sealing-cap 41, fastened down by some adhesive composition. One of these caps is shown thrown back and in position to be closed down in securing the valve to the rods.

A plan of the openings 42 in keyboard 15 is shown in Fig. 3. These openings are covered by the key-valves 27 and 28, which are omitted in this view. Fig. 4 shows the under or opposite side of keyboard 15, with the reeds and other parts in position corresponding to that of the key-valves covering the same from the opposite side.

The respective ends of the slotted metal base-plates 43 are secured to blocks 44, which are in turn rigidly secured to the under side of the reed-board, as more clearly shown in Fig. 8. This provides a space between the reed-board and reeds and forms the cells 45, which are divided by the partition-strips 46.

The vibrating reeds 47 are secured at one end to the base-plates, and the usual leather flap-valves 48 alternate with the reeds and cover the slot or slit in the base-plate adjacent to the reed-slots. The cover C is provided with the air-apertures 49, Fig. 8.

A reed-board 50 is located lower down in the instrument in the bellows-chamber 51, Fig. 8. This reed-board is more especially for bass notes and is seated on supports 52 and 53, which rest on a keyboard or diaphragm 54, secured in the lower casing D.

The series of bass-reeds 55 and the leather flaps 56 are arranged transversely, as are also the reeds 57 and flaps 58 for the minor notes, as shown in Fig. 5. The reeds 59 and 61 are arranged longitudinally. The purpose of this arrangement is to so position the reeds with reference to each other and the limited space occupied that any two reeds may be connected with and operated by one push-button, and thereby get an octave result not possible under the ordinary arrangement of the reeds and operating connection.

An air-space 63 is provided between the reed-board 50 and the lower keyboard 54. The key-valves or dampers for the series of reeds in the board 50 are located on the under side of keyboard 54 and open downwardly therefrom in the air-chamber E, the bottom of the case being provided with air-apertures 64, communicating with chamber E. The keyboard 54 is also provided with means for simulating the notes of the cuckoo, a birdwhistle, and a bell.

All the parts on keyboard 54 are actuated by the two lower rows of push or playing buttons 65 and 66, except an enlarged air-valve, which is operated by the push-button 67, protruding from the bottom of the case, as more clearly shown in Fig. 9.

In the lower series of key-valves the vertical levers employed in connection with the upper keyboard 15 are omitted, the outer ends of wire rods 68 having a direct connection with the different playing-buttons. The wire rods 68 refer to those rods that connect with other parts in actuating the key-valves 69, covering the reed air-openings 70, Fig. 7. The other features will be designated by different reference-numerals. The inner ends of rods 68 connect with crank-arms 71, Fig. 8, on the angle rocking rods 72, the opposite ends of which are secured to the key-valves 69, as best shown in Fig. 6.

The two cuckoo cells or openings 73 and 74 have independent air-chambers 75 and 76, Fig. 7, with contracted communicating passages 77, so as to insure full and clear notes.

The key-valve 78 covers the opening 73, and the key-valve 79 covers the opening 74, which valves control the cuckoo-notes. One end of a valve-rod 80 is secured to the cuckoo-valve 73, the opposite end being pivotally secured, as at $d'$, Fig. 6.

The inner end of an angular rocking rod 81 is attached to the valve-rod 80, as at $d^2$, the opposite end of rocking rod 81 connecting with the push-button wire 82.

The spring 83 exerts a closing pressure on the valve-rod 80 in returning valve 78 to its normally closed position when the pressure on the connecting push-button is relaxed.

The cuckoo-valve 79 is mounted on the inner end of rod 84, the opposite end of which is pivotally secured, as at $d^3$. The rod 84 is raised and the valve 79 opened by a rocking rod 85, connecting with the push-button wire 86. The spring 87 exerts a closing pressure on valve 79.

The whistle-opening 88 is covered by a valve 89, mounted on the joining end of an angle rocking rod 90, as at $d^4$, and which in turn connects with push-button wire 92. A spring 93 provides the closing pressure for the whistle-valve. It will be understood that the different angle rocking rods are provided with suitable supporting-bearings and the valves 69 closed by spring g.

An air-valve 94 is mounted on the inner end of a lever 96, Figs. 6 and 9, and covers the large air-opening 95. The push-button 67 is attached to the opposite end of this lever and projects through the bottom of the case. The lever 96 is retained in its working position by a pivot 97, which provides for the required rocking movement, and a spring 98 acts to normally close the air-valve 94, mounted on the inner end thereof. The large air-opening 95 serves to give a quick admission and a quick release to the volume of air in sounding the full volume of the cuckoo-note at once and as quickly cutting off the sound, as may be required in playing different changes and accompaniments.

The bell 99 is properly secured in place and is adapted to be sounded by a hammer or plunger 100, having a longitudinal movement. One end of the bell-hammer connects with one end of a rocking lever 101, having a pivotal mounting 102. One end of a rod 103 connects with the opposite end of the rocking lever 101, the other end of rod 103 in turn connecting with push-button wire 104.

It will be noted that by the compact arrangement and disposition of the playing parts the musical compass of the instrument is greatly increased and a large volume of sound obtained without enlarging the exterior dimensions of the structure over that of the ordinary.

All the parts are easily assembled or taken apart, thus greatly facilitating repairs.

Having thus described my invention, what I claim as new, and desire to secure by Letters Patent, is—

1. In an accordion, the combination with a reed-board located in the bellows-chamber, of a keyboard positioned below said reed-board, with an intervening air-space, the cuckoo and whistle apertures in the keyboard and opening above the reed-board, the operating key-valves, the enlarged air-aperture, the air-valve covering said enlarged aperture, the push-button, protruding through the bottom of the case, and the independent lever connecting the air-valve and push-button, substantially as described.

2. In an accordion, the combination with a reed-board, located in the bellows-chamber, the series of reeds attached thereto, one or more of which lie in different planes, the keyboard, positioned below its reed-board and providing an intervening space, the key-valves, opening downwardly from said keyboard, the push-buttons, seated in the lower part of the case, and the operative connection between said buttons and valves, substantially as described.

3. In an accordion, the combination with a reed-board, located in the lower part of the bellows-chamber, a keyboard, positioned below the reed-board, the cuckoo and whistle apertures in the keyboard and opening above said reed-board, the series of valves, the push-buttons, seated in the lower part of the case, the operative connections between the valves and buttons, a bell, secured to the keyboard, a plunger-hammer, positioned to strike the bell, and means for actuating said plunger in sounding said bell, substantially as described.

In testimony whereof I affix my signature in presence of two witnesses.

JOHN GOLOB.

Witnesses:
 FRANK L. KNESS,
 L. B. COUPLAND.